United States Patent [19]

Omure et al.

[11] Patent Number: 5,601,753
[45] Date of Patent: Feb. 11, 1997

[54] BLOWING COMPOSITION, METHOD FOR PRODUCING FOAM USING THE COMPOSITION AND FOAM

[75] Inventors: Yukio Omure; Satoshi Ide, both of Osaka, Japan

[73] Assignee: Daikin Industries, Ltd., Osaka, Japan

[21] Appl. No.: 665,841

[22] Filed: Jun. 17, 1996

Related U.S. Application Data

[63] Continuation of Ser. No. 290,702, Aug. 12, 1994, abandoned.

[30] Foreign Application Priority Data

Feb. 14, 1992 [JP] Japan ................................. 4-028451

[51] Int. Cl.$^6$ ........................................... C09K 3/00
[52] U.S. Cl. ................ 252/350; 252/67; 252/69; 521/98; 521/131
[58] Field of Search .................. 252/350, DIG. 9; 521/98, 131

[56] References Cited

U.S. PATENT DOCUMENTS

| | | | |
|---|---|---|---|
| 3,960,792 | 6/1976 | Nakamura | 521/79 |
| 5,234,613 | 8/1993 | Shifflett | 521/131 |
| 5,286,757 | 2/1994 | Smith | 521/79 |
| 5,411,684 | 5/1995 | Tusim et al. | 521/79 |

*Primary Examiner*—Morton Foelak
*Attorney, Agent, or Firm*—Larson & Taylor

[57] ABSTRACT

A blowing composition comprising (1) at least one member selected from the group consisting of difluoromethane, 1,1-difluoroethane and 1,1,1-trifluoroethane and (2) at least one member selected from the group consisting of propane, i-butane, n-butane, pentane, isopentane, cyclopentane and dimethylether; a method for producing a foam by using the composition; and a form according to the method.

4 Claims, No Drawings

BLOWING COMPOSITION, METHOD FOR PRODUCING FOAM USING THE COMPOSITION AND FOAM

This application is a continuation of application Ser. No. 08/290,702 filed Aug. 12, 1994, now abandoned.

FIELD OF THE INVENTION

The present invention relates to a blowing composition for producing foams (foamed articles) of thermoplastic resins, such as polystyrene, polyethylene, polypropylene, etc. and polyurethane.

In the specification and claims, "%" and "parts" means "% by weight" and "parts by weight", respectively.

BACKGROUND OF THE INVENTION

Dichlorodifluoromethane (CFC12), dichlorotetrafluoroethane (CFC114) and like halogenated hydrocarbons have been employed as blowing agents for producing foams of themoplastic resins and polyurethane. In resent years, however, it is pointed out that when released into the atmosphere, some of CFCs would deplete ozone in the stratospheric layer, thereby inflicting a serious adverse influence on the ecosystem including man on the earth. Consequently, a worldwide agreement calls for the restriction of use and production of CFCs having high possibility of depletion of ozone layer. From this point of view, there is a demand for development of a novel blowing agent which has no or very low risk to cause a ozone-depletion problem.

LPG seems to be employed instead of CFCs with such problems. However, using LPG as a blowing agent has another serious problem that foam products having homogeneous cells can not be obtained by LPG.

DISCLOSURE OF THE INVENTION

The present inventors have conducted extensive research in considering the prior art, and found that a composition comprising (1) at least one member selected from the group consisting of difluoromethane, 1,1-difluoroethane and 1,1,1-trifluoroethane and (2) at least one member selected from the group consisting of propane, i-butane, n-butane, pentane, isopentane, cyclopentane and dimethylether has blowing characteristics which can not be predicted from those of the component substances taken individually, i.e., excellent in dimensional stability, appearance, compressive strength and homogeneity of cells, thereby exerts excellent effects as a blowing agent on the production of foams of a thermoplastic resin and urethane.

Thus, the invention provides compositions for producing foams of a thermoplastic resin and urethane shown below:

A blowing composition comprising (1) at least one member selected from the group consisting of difluoromethane (hereinafter HFC32), 1,1-difluoroethane (hereinafter HFC152a) and 1,1,1-trifluoroethane (hereinafter HFC143a) (hereinafter "first component") and (2) at least one member selected from the group consisting of propane, i-butane, n-butane, pentane, isopentane, cyclopentane and dimethylether (hereinafter "second component").

A blowing composition comprising (1) 95–5% of at least one member selected from the group consisting of HFC32, HFC152a and HFC152a and (2) 5–95% of at least one member selected from the group consisting of propane, i-butane, n-butane, pentane, isopentane, cyclopentane and dimethylether.

The invention further provides a method for producing foams using the above-mentioned blowing composition:

A method for producing foams comprising using a composition comprising (1) at least one member selected from the group consisting of difluoromethane, 1,1-difluoroethane and 1,1,1-trifluoroethane and (2) at least one member selected from the group consisting of propane, i-butane, n-butane, pentane, isopentane, cyclopentane and dimethylether as a blowing agent.

A method for producing foams comprising using a composition comprising (1) 95–5% of at least one member selected from the group,consisting of difluoromethane, 1,1-difluoroethane and 1,1,1-trifluoroethane and (2) 5–95% of at least one member selected from the group consisting of propane, i-butane, n-butane, pentane, isopentane, cyclopentane and dimethylether as a blowing agent.

The invention further provides foams shown below:

A foam produced by using a composition comprising (1) at least one member selected from the group consisting of difluoromethane, 1,1-difluoroethane and 1,1,1-trifluoroethane and (2) at least one member selected from the group consisting of propane, i-butane, n-butane, pentane, isopentane, cyclopentane and dimethylether as a blowing agent.

A foam produced by using a composition comprising (1) 95–5% of at least one member selected from the group consisting of difluoromethane, 1,1-difluoroethane and 1,1,1-trifluoroethane and (2) 5–95% of at least one member selected from the group consisting of propane, i-butane, n-butane, pentane, isopentane, cyclopentane and dimethylether.

The blowing composition and the foam obtained by using the composition can be applied to a thermoplastic resin and polyurethane.

Physicochemical properties of HFC32, HFC152a HFC143a and n-butane used in the blowing system of the invention are shown in table 1.

TABLE 1

| Formula | HFC32 $CH_2F_2$ | HFC152a $CHF_2CH_3$ | HFC143a $CH_3CF_3$ | n-butane $C_4H_{10}$ |
|---|---|---|---|---|
| Molecular weight | 52 | 66 | 84 | 58 |
| Boiling point (°C.) | −52 | −25 | −48 | 0 |
| Ozone depleting potential | 0 | 0 | 0 | 0 |

In the blowing composition of the invention, simultaneous use of (1) at least one member selected from the group consisting of HFC32, HFC152a and HFC143a and (2) at least one member selected from the group consisting of propane, i-butane, n-butane, pentane, isopentane, cyclopentane and dimethylether is essential.

As a second component, each of pure compound can be used singly or in a mixture thereof and LPG like mixture can also be used.

With regard to the composition of the invention, foams with low expansion and blowing failure tends to occur, when the proportion of first component is more than 95%. On the other hand, dimensional stability tends to be reduced, and a foam product has more wrinkle leading to poor appearance, when the proportion of second component is more than 95%.

A decomposition inhibitor can be formulated, when necessary, to the composition of the invention. Preferred decomposition inhibitors are selected from the group consisting of nitro compounds, unsaturated hydrocarbons, epoxy compounds, ether compounds, phenol compounds, ester compounds, alkylamine compounds, cyclic amine compounds and unsaturated alcohol compounds.

The blowing composition of the invention can be employed in the same manner as known blowing compositions for the production of foams of a thermoplastic resin and polyurethane.

The foaming material, viz. the substrate material to be foamed includes thermoplastic resins, such as polystyrene, polyethylene, polypropylene, polyester, polyvinyl-chloride, acryl, polyacetal, polyamide, ABS and copolymer thereof and polyurethane.

The effective amount of the blowing agent of the invention relative to the substrate material may be the same as that of the known blowing agents and can be selected according to the type of substrate resin material and the desired foam density. Generally, however, about 0.001 to 0.5 mole can be used to each 100 grams of the substrate material.

The procedure to be followed for the production of resin foams employing the blowing agent of the present invention is also similar to the conventional one. Thus, there can be mentioned, inter alia, (a) a process comprising melting the substrate resin by heating, mixing the blowing agent with the melt at elevated temperature and pressure and extruding the molten mixture into a low-pressure zone for expansion, (b) a batch foaming process comprising melting the substrate resin by heating, mixing the blowing agent with the melt at elevated temperature and pressure and decompressing the system for expansion, and (c) a thermal foaming process comprising crosslinking the substrate resin by means of an electron beam or a chemical crosslinking agent, adding the blowing agent thereto and heating the mixture for expansion.

The blowing agent of the present invention can be used in the manufacture of a variety of shaped articles such as sheet, block, bar, tube, cladding (electric wire or cable insulating cover) and pattern moldings.

The present invention accomplishes the following effects.

The substances used according to the invention, namely HFC-32, HFC-152a, HFC-143a and butane, etc., invariably have an ozone depletion potential of 0 (nil) or no risk for destruction of the ozone layer.

Furthermore, the blowing system of the invention used in the mixture of first component and second component is superior to any of its components used alone provides foams very satisfactory in dimensional stability, appearance, compressive strength and homogeneity of cells.

EXAMPLE

The following examples and comparative examples are intended to point out the salient features of the invention with further clarity.

In the following description, the components of the blowing compositions used in the examples and comparative examples are abbreviated as follows.

difluoromethane: 32

1,1-difluoroethane: 152a 1,1,1-trifluoroethane: 143a dimethylether: DME

As a second component, LPG consisting of n-butane 59.8%, i-butane 35.6% and propane 3.6% and dimethylether was employed. Examples 1–12 (Ex. No. 1–12) and comparative examples 1–5 (Comp. Ex. No. 1–5)

Polyethylene foam was produced according to the following procedure.

To 100 parts of low density polyethylene resin (melt index=2.3; density=0.921 g/cm$^3$) were added 0.5 parts of finely divided talc and 1.0 part of stearoamide concentrate as a dimension stabilizer, and the mixture was evenly premixed.

The blowing agents of the invention were prepared by combining LPG or dimethylether and at least one member selected from the group consisting of 32, 152a and 143a in the proportion shown in table 2-A. Table 2-B shows blowing agents outside of the compositional range of the invention as comparative examples 1–5.

In all the examples and comparative examples, the same equipment was employed. The equipment was a screw extruder comprising a hopper, feed section, metering section, melting section, mixing section and cooling section, with a blowing agent injection port in the center of the cylinder.

The die used was a rod die having a resin discharge orifice 4 mm in diameter. The temperatures of the various sections of the extruder were about 140° C. in the feed section, about 180° C. in the metering and melting sections, about 150° C. in the mixing section, and about 110° C. in the cooling section.

The above raw resin material was fed from the hopper at the rate of about 5 kg per hour and the blowing composition was injected in the proportion indicated in Table 2-A and Table 2-B. The mixing ratio represents the amount of the blowing agent in parts by weight to each 100 parts by weight of the resin.

The resin expanded remarkably upon discharge from the nozzle to give a rod-shaped foam with a diameter of 30 to 40 mm.

The product foam was evaluated for density, stability and appearance. The results are presented below in Table 2-A and Table 2-B.

TABLE 2-A

| Ex. No. | Blowing agent | Composition (%) | Mixing ratio (parts) | Foam density (g/cm$^3$) | Foam stability (%) | Appearance |
|---|---|---|---|---|---|---|
| 1 | 32 | 90 | 5.3 | 0.035 | 95 | ○ |
|   | LPG | 10 | | | | |
| 2 | 32 | 50 | 5.5 | 0.032 | 96 | ⊙ |
|   | LPG | 50 | | | | |
| 3 | 32 | 10 | 5.7 | 0.036 | 92 | ○ |
|   | LPG | 90 | | | | |
| 4 | 143a | 90 | 8.0 | 0.036 | 94 | ○ |
|   | LPG | 10 | | | | |
| 5 | 143a | 50 | 6.9 | 0.034 | 96 | ⊙ |
|   | LPG | 50 | | | | |
| 6 | 143a | 10 | 6.0 | 0.038 | 92 | ○ |
|   | LPG | 90 | | | | |
| 7 | 152a | 90 | 6.5 | 0.036 | 93 | ○ |
|   | LPG | 10 | | | | |
| 8 | 152a | 50 | 6.2 | 0.033 | 96 | ⊙ |
|   | LPG | 50 | | | | |
| 9 | 152a | 10 | 5.9 | 0.040 | 92 | ○ |
|   | LPG | 90 | | | | |
| 10 | 32 | 50 | 4.9 | 0.032 | 96 | ⊙ |
|   | DME | 50 | | | | |
| 11 | 152a | 50 | 5.4 | 0.033 | 96 | ⊙ |
|   | DME | 50 | | | | |
| 12 | 32 | 40 | 5.7 | 0.032 | 98 | ⊙ |
|   | 143a | 10 | | | | |
|   | LPG | 50 | | | | |

TABLE 2-B

| Comp. Ex. No. | Blowing agent | Composition (%) | Mixing ratio (parts) | Foam density (g/cm³) | Foam stability (%) | Appearance |
| --- | --- | --- | --- | --- | --- | --- |
| 1 | 32 | 100 | 5.2 | 0.040 | 80 | x |
| 2 | 143a | 100 | 8.4 | 0.045 | 85 | x |
| 3 | 152a | 100 | 6.6 | 0.034 | 90 | Δ |
| 4 | LPG | 100 | 5.8 | 0.030 | 80 | x |
| 5 | DME | 100 | 4.6 | 0.030 | 80 | x |

In the above tables, the foam stability is the volume fraction of the foam after one day of standing at room temperature, with the volume of the foam immediately after extrusion being taken as 100.

The appearance of the foam was the result of evaluation for surface smoothness and skin condition on the following scale:

⊚ Excellent, o Good, Δ Ordinary, x Poor.

In Comparative Examples 1–4 where 32, 152a, 143a and LPG were respectively used as the blowing agent, the product foam was expanded poorly. In Comparative Examples 4 and 5 where LPG and DME were respectively used as the blowing agent, the product foam was poor in dimensional stability and presented with a copiously wrinkled surface.

The data presented in Table 2-A and Table 2-B indicate clearly that compared with the control blowing agents, the blowing composition of the present invention is superior in stability and appearance.

We claim:

1. A blowing composition comprising (1) difluoromethane only, or at least two members selected from the group consisting of difluoromethane, 1,1-difluoroethane 1,1,1-trifluoroethane and (2) at least one member selected from the group consisting of, i-butane, n-butane, pentane, isopentane, cyclopentane and dimethylether.

2. A blowing composition for thermoplastic resin according to claim 1 comprising (1) difluoromethane only, or at least two members selected from the group consisting of difluoro-methane, 1,1-difluoroethane and 1,1,1-trifluoroethane and (2) at least one member selected from the group consisting of, i-butane, n-butane, pentane, isopentane, cyclopentane and dimethylether.

3. A blowing composition for a thermoplastic resin according to claim 1 comprising (1) 95–5% of difluoromethane only, or at least two members selected from the group consisting of difluoro-methane, 1,1-difluoroethane and 1,1,1-trifluoroethane and (2) 5–95% of at least one member selected from the group consisting of, i-butane, n-butane, pentane, isopentane, cyclopentane and dimethylether.

4. A blowing composition for thermoplastic resin according to claim 2, wherein a thermoplastic resin is at least one member selected from the group consisting of, in addition to polystyrene, polyethylene and polypropyrene, polyester, polyvinylchloride, acryl, polyacetal, polyamide, ABS and copolymer thereof.

* * * * *